United States Patent Office 3,200,714
Patented Aug. 17, 1965

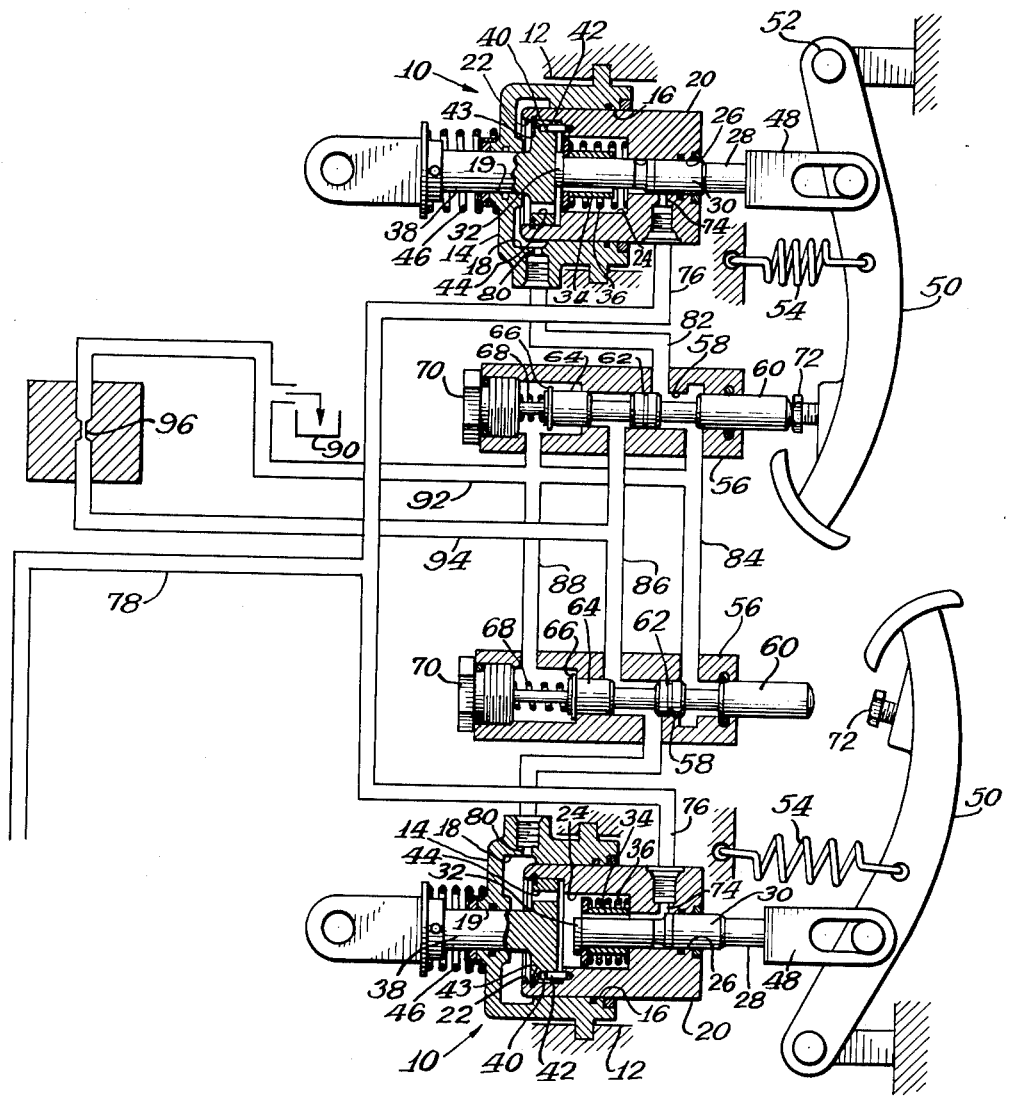
Inventors:
Eugene P. Virtue
Marvin D. Jennings
William C. Swanson
By Julian Schachner
Atty.

3,200,714
FORCE BOOSTER
Eugene P. Virtue, Tinley Park, Marvin D. Jennings, Naperville, and William C. Swanson, Clarendon Hills, Ill., assignors to International Harvester Company, Chicago, Ill., a corporation of New Jersey
Filed May 23, 1963, Ser. No. 282,710
2 Claims. (Cl. 91—378)

This invention relates generally to force booster systems and more particularly to systems incorporating a plurality of force boosters capable of either independent or simultaneous actuation, wherein fluid pressure in the force boosters is equalized during simultaneous actuation.

In many mechanical systems, such as brakes for example, a device is operated by means of a control which moves in response to an externally applied force and transmits this force through suitable linkage to the operating element of the device for effecting engagement and disengagement. Such systems are often large and complex due to the necessity of designing them for use under large power requirements. Accordingly, they would require large forces for operation were it not for the provision of boosters.

Where a plurality of brakes are incorporated in an automotive vehicle, such as a tractor for example, it has been established that a power assist in the form of a hydraulically actuated force booster is convenient for aiding the operator of the vehicle in engaging and disengaging the brakes. In tractors it is desirable to have a flexible force assisting system wherein the brakes may be selectively actuated independently or simultaneously, at will. Generally in a vehicle having a plurality of brakes there is provided a plurality of force boosters, each individually associated with a brake. Heretofore a pressure variation in the hydraulically actuated force boosters tended to result in a variation of the resulting forces applied to the several brakes. The provision of economical and efficient means for overcoming this annoying and sometimes dangerous defect would result in an improved booster system. Our invention deals with this problem.

A primary object of this invention is to provide a fluid-operated booster system for assisting in the actuation of mechanical devices.

Another object of this invention is to provide a fluid-operated booster system capable of independently or simultaneously actuating associated mechanical devices wherein fluid pressure within the booster system is equalized during simultaneous actuation.

Another object of this invention is to provide a force booster system affording smooth operation during the application thereof and quick release as well as blocking of the equalization upon disengagement.

Another object of this invention is to provide a force booster system affording limited mechanical operation in the event of failure in the power-assist feature.

Another object of this invention is to provide a force booster system which is reliable in operation and economical in construction.

These and other objects of this invention will become apparent to those skilled in the art upon careful examination of the following disclosure taken in conjunction with the drawing wherein is depicted a pair of force boosters each with an associated equalizer valve, one of which is in the engaging position and the other of which is in the disengaging position.

Briefly, the invention provides for an interconnecting booster system between a pedal control and a brake, for example. Initial application of external force to the pedal control allows a smooth takeup of slack in the system and associated linkage. Continued movement of the pedal control serves to introduce fluid to the system and to move an associated equalizer valve to a position in which a differential in fluid pressure buildup develops, which pressure differential in turn causes movement of a pressure-responsive piston to provide power assist for the transmission of forces, thereby overcoming the resistance of the brake and insuring a smooth operation thereof. The brake boosters are intercommunicated through their associated equalizer valves when simultaneously moved to the engaging positions thereof. This intercommunication is disrupted when one of the boosters is actuated independently.

Referring more in detail to the accompanying drawing, wherein like elements are identified by like reference numerals, a pair of force boosters 10 are suitably secured to a vehicle frame 12 and are connected between brakes or other force-operated devices (not shown). Each brake booster 10 is provided with a housing 14 defining a cylinder 16 having an enlarged chamber 18 at one end thereof.

A piston 20 is slidably received in cylinder 16. Pistor 20 is formed with a first relatively large bore 22 extending inwardly from the end thereof adjacent chamber 18 of housing 14. A bore 24 of intermediate size extends inwardly from bore 22 and a relatively small bore 26 extends through piston 20 from intermediate bore 24. A spool 28 having a land 30 is slidably received in the relatively small bore 26 of piston 20. The spool 28 extends into intermediate bore 24 and is provided at the end thereof with an enlarged flange portion 32. Spool 28 carries a flanged sleeve 34 in intermediate bore 24, through which spool 28 is biased by a spring 36 into engagement with flange portion 32.

A brake operating rod 38 is slidably received in a bore 19 of housing 14. Rod 38 has an enlarged inner end portion 40 which complements the relatively large bore 22 of piston 20. One or more dowel pins 42 engages end portion 40 of rod 38 with piston 20 for movement therewith. A snap ring 43 serves to lock end portion 40 and piston 20 in secure engagement. End portion 40 of rod 38 defines a fluid passage 44 extending therethrough. A spring 46 biases rod 38 and piston 20 towards a position in which piston 20 extends a minimum distance outwardly from housing 14. Spring 36 serves to bias sleeve 34 and spool 28 to a position in which flange portion 32 abuts end portion 40 of rod 38.

Spool 28 is affixed to a mechanical pickup 48 which, in turn, is engageable by a control pedal 50 for actuation of the system. Pivotal movement of pedal 50 about pivot point 52 engages pickup 48 to move spool 28. A spring 54 biases pedal 50 to its disengaged position.

An equalizer valve block 56 is associated with each booster 10 and is provided with a bore 58 extending therethrough. A valve spool 60 is slidably received in bore 58 and includes lands 62 and 64. A flange portion 66 on valve spool 60 serves to limit the extent of movement of valve spool 60 under the influence of a biasing spring 68 which reacts against a plug 70 in valve block 56. Valve block 56 is so oriented relative to booster housing 14 and pedal 50 that an abutment in the form of a screw 72 extending from pedal 50 is engageable with valve spool 60 to move same against the force of biasing spring 68. Alternatively, screw 72 is disengageable from spool 60 to allow movement thereof under the influence of biasing spring 68.

Each piston 20 is provided with a flow passage 74 connectable with a fluid inlet line 76. Each of the fluid inlet lines 76 is in turn connected to a main fluid pressure line 78 carrying fluid from a conventional source of pressure (not shown). Each booster housing 14 is provided with a fluid passage 80 extending from chamber 18 to a fluid outlet line 82.

Equalizer valve bodies 56 are intercommunicated by fluid lines 84, 86, and 88. Each fluid line 82 communicates with its associated bore 58 of body 56 intermediate the communication therewith of lines 84 and 86. Line 84 is in communication with reservoir 90 directly through a line 92. Line 86 is in communication with reservoir 90 through a line 94 having therein a fluid flow restriction 96. Line 88 in direct communication with reservoir 90 through line 92 serves to relieve pressure built up behind spools 60.

As seen in the drawing, each of the force boosters and associated equalizer valves are similar, the upper being shown in the first or normally at rest position, and the lower being shown in the second or actuating position.

In the first position, spring 54 biases control pedal 50 so as to engage screw 72 with valve spool 60, thereby overcoming the force of biasing spring 68. Valve spool 60 is moved to the left as shown in the drawing to a position in which land 62 establishes fluid communication bebetween lines 82 and 84 while blocking fluid communication between lines 82 and 86. When both boosters are in this position, their respective chambers 18 are thus communicated directly with reservoir 90 through lines 82, 84, and 92. The spring 46 biases rod 38 and piston 20 to the left as shown in the drawing and spring 36 biases spool 28 to the left so as to abut flange 32 against end portion 40 of rod 38. In this position, land 30 of spool 28 blocks communication between passage 74 and bore 26 of piston 20. No fluid from pressure source 78 enters the system.

When it is desired to engage one of the booster systems, for example the lower one shown in the drawing, force is applied to pivot pedal 50 about point 52. Screw 72 is disengaged from valve spool 60. Under the influence of biasing spring 68, land 62 blocks communication between lines 82 and 84 while establishing communication between lines 82 and 86. Pedal 50 carries spool 28 to the right as shown in the drawing to a position in which land 30 establishes metered fluid communication between passage 74 and bore 26. Fluid flows through bores 26, 24, and 22 and then through passage 44 into chamber 18. Fluid is directed from chamber 18 through lines 80, 82, 86, and 94 to reservoir 90. However, the flow restriction 96 causes a backup of fluid pressure within force booster 10. By virtue of differential areas subjected to fluid pressure, piston 20 is carried to the right as shown in the drawings, thereby carrying rod 38. This provides power assist for actuation of the associated brake.

When both boosters are actuated simultaneously, equalization of pressure in each is assured by virtue of the intercommunication of respective chambers 18 through lines 82 and 86 associated with the equalizer valves. Thus all brakes will be actuated under the influence of the same force regardless of wearing or adjustment variations.

Release of the booster is accomplished through removal of pressure from pedal 50. Biasing spring 54 pivots pedal 50, thereby engaging screw 72 with valve spool 60. Valve spool 60 maintains communication between booster 10 and reservoir 90; however, communication is direct through line 92 rather than through restriction 96 in line 94. The differential forces acting on piston 20 are relieved and booster 10 is returned to its first position by springs 36 and 46. Power assist for the associated brake is quickly released.

In the event of power failure, movement of pedal 50 in the engaging direction compresses spring 36 until mechanical resistance to actuation of the brake is overcome. Thereafter, continued movement of pedal 50 carries piston 20 and rod 38 to the right as shown in the drawing, thus actuating the brake mechanically.

While the preferred embodiment of the invention has been shown and described hereinabove, various modifications will suggest themselves to those skilled in the art, which modifications do not depart from the spirit and scope of the appended claims.

We claim:

1. For use with a plurality of force operated devices offering increased resistance as force applied thereto is increased and a plurality of force transmitting means for operating the devices in response to application of external force; the combination comprising force booster means adapted to be interposed between each device and an associated force transmitting means; each of said force booster means including a housing defining a cylinder, a pressure responsive piston having a bore therein slidable in said cylinder, a fluid inlet communicating with said bore and a fluid outlet communicating with said cylinder, first flow control means slidable in said bore between a first position blocking communication between said fluid inlet and said cylinder and a second position establishing communication between said fluid inlet and said cylinder, means biasing said first flow control means toward its first position, second flow control means in said fluid outlet movable between a first position establishing relatively unrestricted communication in said outlet and a second position establishing relatively restricted communication in said outlet, means biasing said second flow control means toward its second position, and means associated with said first and second flow control means for causing coordinated movement of said first and second flow control means toward their respective second positions upon application of external force to the force transmitting means; and fluid passage means interconnecting said cylinders of said force booster means through said second flow control means, each of said second flow control means blocking said fluid passage means when in its second position.

2. In combination: a plurality of force operated devices; a plurality of force transmitting members; and a plurality of force boosters each interconnecting one of said devices with an associated member, each of said boosters including a housing defining a cylinder, a piston having a bore therein slidable in said cylinder, a fluid inlet and a fluid outlet in communication through said bore and said cylinder, first flow control means slidable in said bore between first and second positions respectively blocking and unblocking said inlet, said one device and said associated member being connected respectively with said piston and said first flow control means, a spring interposed between said piston and said first flow control means biasing said first flow control means toward its first position, second flow control means in said outlet movable between first and second positions respectively establishing relatively unrestricted and relatively restricted communication therein, and means biasing said second flow control means toward its second position; said member including means for allowing movement of said second flow control means toward its second position upon movement of said member to slide said first flow control member toward its second position; and fluid passage means interconnecting said cylinders of said force boosters through said second flow control means; said second flow control means blocking said fluid passage means when in their second positions.

References Cited by the Examiner

UNITED STATES PATENTS

| | | | |
|---|---|---|---|
| 1,890,010 | 12/32 | Vickers | 60—52 |
| 2,472,236 | 6/49 | Thomas | 91—378 X |
| 2,887,187 | 5/59 | Fletcher et al. | 60—54.6 X |
| 2,946,195 | 7/60 | Hare | 60—54.5 |
| 3,075,355 | 1/63 | Baker | 60—97 |

JULIUS E. WEST, *Primary Examiner.*

ROBERT R. BUNEVICH, *Examiner.*